US011472642B2

(12) United States Patent
Fourney et al.

(10) Patent No.: US 11,472,642 B2
(45) Date of Patent: Oct. 18, 2022

(54) BIN UNLOADER

(71) Applicant: Laitram, L.L.C., Harahan, LA (US)

(72) Inventors: Matthew L. Fourney, Laurel, MD (US); Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/279,883

(22) PCT Filed: Oct. 15, 2019

(86) PCT No.: PCT/US2019/056258
§ 371 (c)(1),
(2) Date: Mar. 25, 2021

(87) PCT Pub. No.: WO2020/086329
PCT Pub. Date: Apr. 30, 2020

(65) Prior Publication Data
US 2022/0017311 A1   Jan. 20, 2022

Related U.S. Application Data

(60) Provisional application No. 62/748,824, filed on Oct. 22, 2018.

(51) Int. Cl.
*B65D 88/60* (2006.01)
*B65G 65/23* (2006.01)
*B66D 1/60* (2006.01)

(52) U.S. Cl.
CPC ............. *B65G 65/23* (2013.01); *B65D 88/60* (2013.01); *B66D 1/60* (2013.01)

(58) Field of Classification Search
CPC ................................ B65D 88/60; B65D 88/62
See application file for complete search history.

(56) References Cited

U.S. PATENT DOCUMENTS 2,767,536 A * 10/1956 Forkel ................. B65H 67/066
222/405
3,045,846 A *  7/1962 Clark .................... B65G 47/14
414/539

(Continued)

FOREIGN PATENT DOCUMENTS

| EP | 0729909 A1 | 9/1996 |
| JP | 07-179225 A | 7/1995 |
| WO | 02-20377 A1 | 3/2002 |

OTHER PUBLICATIONS

First Office Action and Search Report of Chinese Patent Application No. 201980067196.7, dated Aug. 23, 2022, China National Intellectual Property Administration.

*Primary Examiner* — Jonathan Snelting
(74) *Attorney, Agent, or Firm* — James T. Cronvich

(57) ABSTRACT

An article-unloading apparatus comprising a bin assembly including a bag inside a bin. The bin assembly is raised and lowered by a lift and tilted, when raised, to dump articles onto a decline conveyor, such as a ramp. A winch attached to the bag moves the bottom of the bag through the bin to help push articles from the tilted bin assembly. A camera takes a video image of the articles entering the ramp to detect clumps. Stops on the ramp are selectively actuated to block the bottom-most articles in a clump to help separate articles.

23 Claims, 9 Drawing Sheets

(56) References Cited

U.S. PATENT DOCUMENTS

| | | | | |
|---|---|---|---|---|
| 4,802,810 | A * | 2/1989 | Gunn | B65G 59/08 |
| | | | | D34/28 |
| 5,017,074 | A * | 5/1991 | Fabbri | B23B 13/08 |
| | | | | 198/453 |
| 5,176,299 | A | 1/1993 | Krooss | |
| 5,452,984 | A * | 9/1995 | Porter | B65G 47/5195 |
| | | | | 414/327 |
| 5,489,037 | A * | 2/1996 | Stopper | B65D 90/047 |
| | | | | 220/1.5 |
| 5,558,485 | A | 9/1996 | Haynes | |
| 5,573,365 | A * | 11/1996 | Michalski | B65G 35/04 |
| | | | | 414/811 |
| 5,641,263 | A * | 6/1997 | Ogrinc | B65G 47/14 |
| | | | | 414/745.9 |
| 6,164,502 | A | 12/2000 | Musco | |
| 7,086,781 | B2 * | 8/2006 | Richardson, Jr. | B65D 88/1618 |
| | | | | 383/33 |
| 10,926,948 | B2 * | 2/2021 | McKee | B62B 1/14 |
| 11,148,889 | B2 | 10/2021 | Hartmann | |
| 2002/0157918 | A1 | 10/2002 | Brouwer et al. | |
| 2007/0000759 | A1 * | 1/2007 | Knapen | B65G 35/04 |
| | | | | 198/527 |

\* cited by examiner

BIN UNLOADER

BACKGROUND

The invention relates generally to devices for emptying articles from bins.

Parcels amassed in a bin are conventionally unloaded by lifting the bin above a downward-sloping conveyor or slide and then upending the bin to dump the parcels onto the conveyor or slide, from which the parcels are conveyed to a processing system. The parcels often fall from the bin in clumps or stacks, and they have to be separated for processing. And the parcels can be damaged from the dumping.

SUMMARY

One version of an article-unloading apparatus embodying features of the invention comprises a bin having an interior and a top opening bounded by a rim, a bag for holding articles, and a winch. The bag has a bottom in the interior of the bin and an opposite top edge portion. The winch is connected to the bag to raise and lower the bottom of the bag through the interior of the bin.

Another version of an article-unloading apparatus embodying features of the invention comprises a bin having an interior and a top opening bounded by a rim, a bag for holding articles in the interior of the bin, and a winch connected to the bag to increase and decrease the volume of the bag in the interior of the bin.

DETAILED DESCRIPTION

Figure 1:
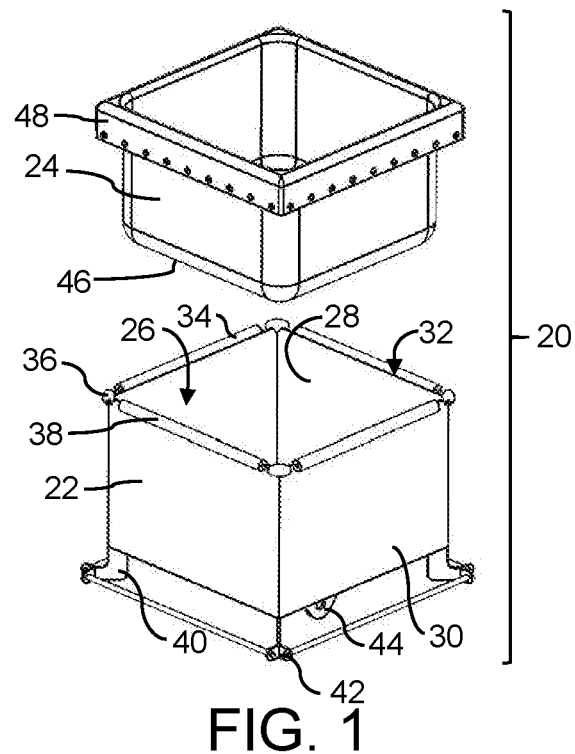
FIG. 1 is an exploded isometric view of an article-unloading bin embodying features of the invention.

A portion of an article-unloading apparatus embodying features of the invention is shown in FIG. 1. A bin assembly 20 for holding parcels, letters, or other articles includes a bin 22 and a bag 24. The bin 22 has an interior 26 bounded by a side wall 28 formed by four side panels 30 to give the bin a rectangular cross section. But the bin 22 could have other cross sections, such as circular. The interior 26 of the bin has a top opening 32 bounded by a rim 34 along the top of the side wall 28. The rim 34 has rollers 36, 38 or rounded shoes at the corners and along the sides. Arms 40 extending down from the bottom of the bin 22 at the four corners terminate in pairs of brackets 42. Also extending downward from the bottom of the bin 22 is a pair of pivot eyes 44. The bag 24 has a bottom 46 and an opposite top edge portion 48. The majority of the bag 24, including the bottom 46, resides in the interior 26 of the bin 22 to receive articles. The top edge portion 48 is lapped over the bin's rim 34.

Figure 2:
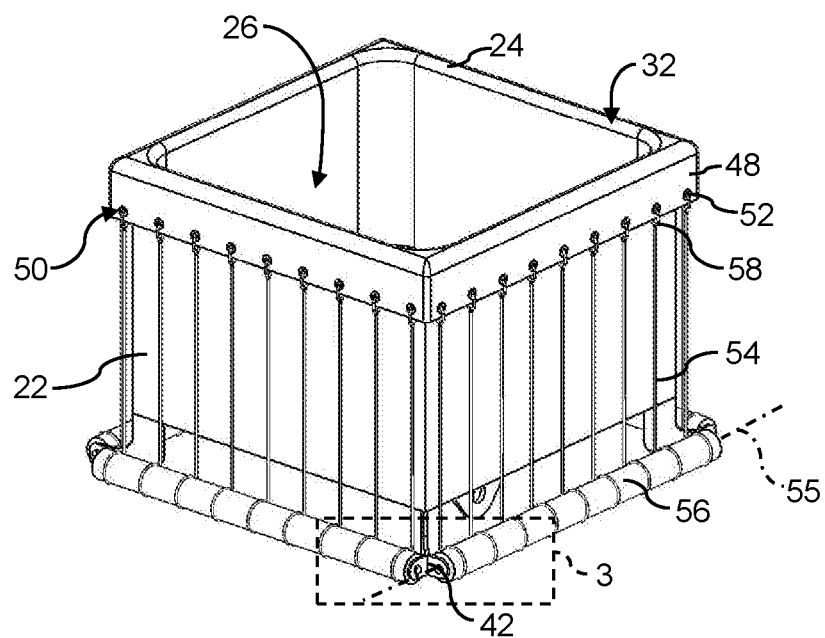
FIG. 2 is an isometric view of the bin of FIG. 1 with a winch.
Figure 3:
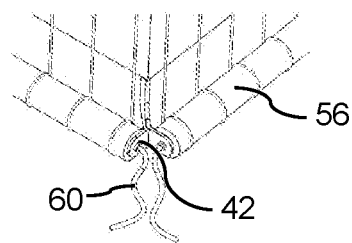
FIG. 3 is an enlarged view of the winch of FIG. 2.

As shown in FIG. 2, the top edge portion 48 of the bag 24 has a series of holes 50 reinforced with grommets 52. Lines 54 are wound around reels 56 in the form of motorized rollers attached at opposite ends to the brackets 42 at the bottom corners of the bin 22. Axes 55 of the motorized rollers 56 are parallel to the sides of the bin 22. Distal ends 58 of the lines 54 attach to the top edge portion 48 of the bag 24 through the grommets 52 in the holes 50. The reels 56 rotate to reel in the lines 54 and pull down on the top edge portion 48 of the bag 24 to drag it over the bin's rim 34 and move the bottom 46 of the bag and its contents through the interior 26 toward the top opening 32 of the bin 22. Each reel 56 is shown as an elongated motorized roller winding all the lines 54 on its side of the bin 22. But the elongated rollers could be replaced by individual motorized pulleys—one for each line 54. The lines 54 can be cables, cords, ropes, or plastic filaments, for example. As shown in FIG. 3, the motorized reels 56 are mounted for rotation between the brackets 42. Wires 60 extend out the ends of the motorized reels 56 and through the brackets 42 to receive electrical power to wind the reels.

Figure 4A:
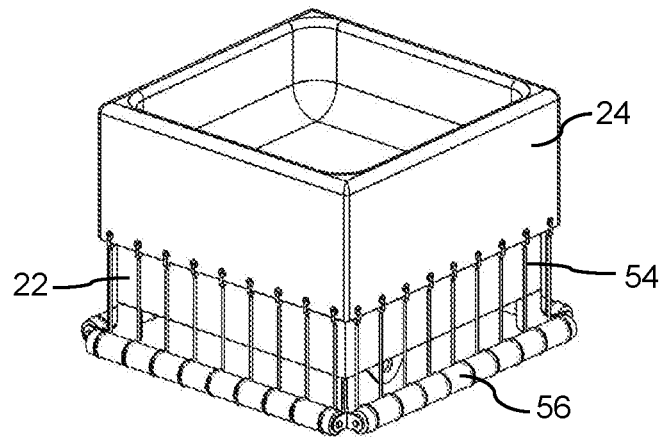
FIGS. 4A and 4B are isometric views of the bin of FIG. 2 showing sequentially the inversion of the article-holding bag.
Figure 4B:
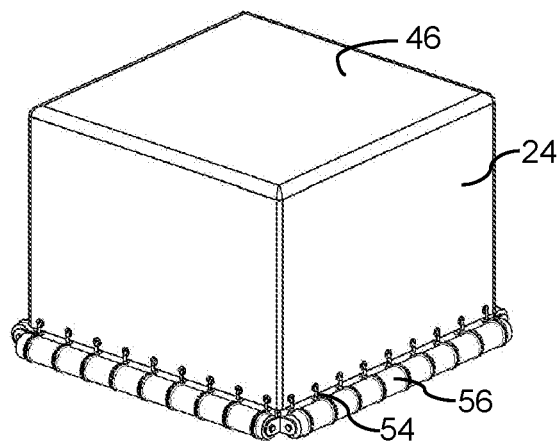

The reels 56 and the lines 54 attached to the top edge portion 48 of the bag 24 form a motorized winch to invert the bag around the bin 22 and decrease the bag's volume in the bin's interior 26 and to return the bag to its increased-volume, non-inverted state in the bin's interior. The sequence of inverting the bag 24 follows from FIG. 2 to FIGS. 4A and 4B. In FIG. 4A the bag 24 is shown about hall-inverted with the lines 54 being reeled in by the reels 56. In FIG. 4B the bag 24 is fully inverted with its bottom 46 at the top of the bin. The rollers or low-friction rounded shoes along the bin's rim (FIG. 1) provide rolling or low-friction contact with the bag as it rides over the rim. The bottom 46 of the bag 24 is weighted with a metal plate in a pocket for example, at the bottom. By gravity the weighted bottom 46 helps keep the bag 24 open and helps unreel the lines 54 from the reels to return the bag to its non-inverted state in the interior of the bin.

Figure 5A:
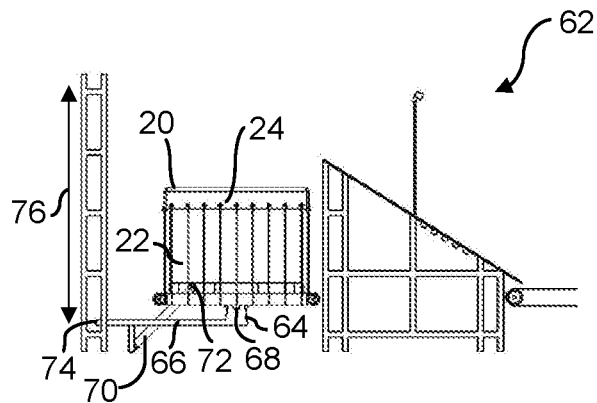
FIGS. 5A-5C are side elevation views of the bin of FIG. 2 in an unloading apparatus embodying features of the invention showing the lifting and start of the unloading sequence.
Figure 5B:
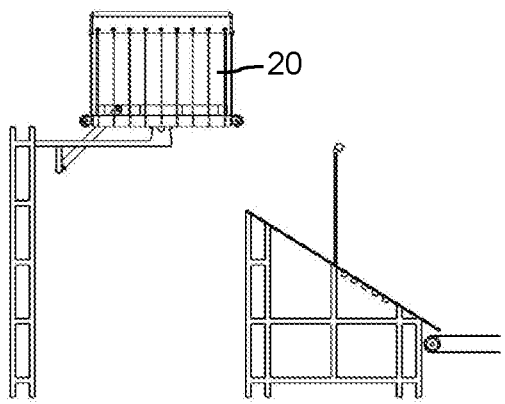
Figure 5C:
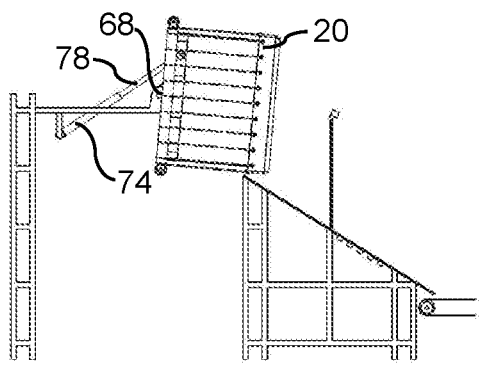

The bin assembly 20 is shown in an unloading apparatus 62 in FIGS. 5A-5C, which depict a lifting and unloading sequence. The bag 24 is shown in a non-inverted state. The bin 22 is tiltably connected to pivot brackets 64 at the distal end of a cantilevered frame 66. A pivot bar 68 extends through the pivot brackets 64 and the pivot eyes (44, FIG. 1) of the bin 22. A tilt actuator 70 is pivotably attached between the cantilevered frame 66 and a pivot 72 on the bin 22 to form a tilter. The cantilevered frame 66 is attached at its proximal end 74 to a lift 76 that lifts and lowers the frame and the bin assembly 20 between a lowered position as shown in FIG. 5A and a raised position as shown in FIG. 5B. Once the bin assembly is lifted as in FIG. 5B, it is then tilted as shown in FIG. 5C by the tilter. The tilt actuator 70 extends its piston arm 78 to tilt the bin assembly 20 on the pivot bar 68 to dump articles as further shown in the sequence illustrated in FIGS. 6A-6C.

Figure 6A:
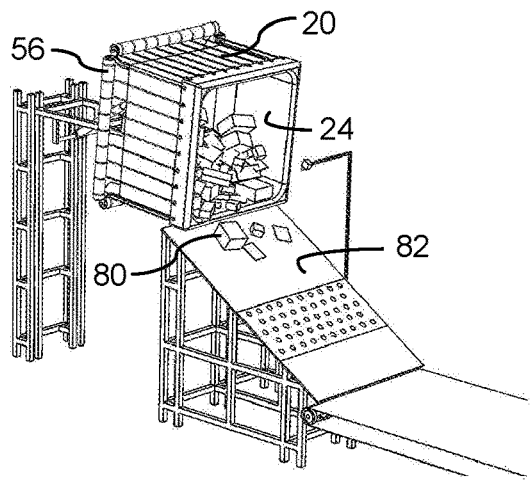
FIGS. 6A-6C are isometric views of the unloading apparatus of FIGS. 5A-5C showing the unloading sequence.
Figure 6B:
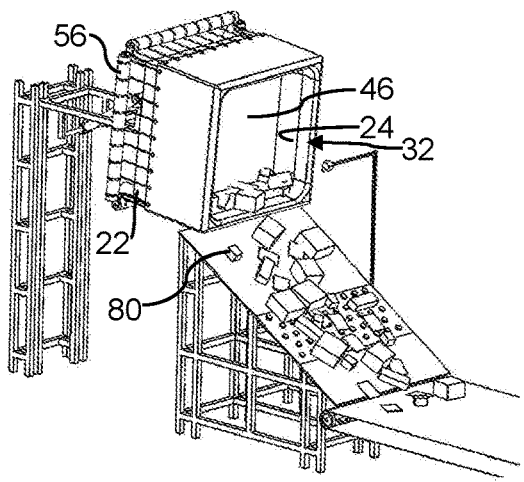
Figure 6C:
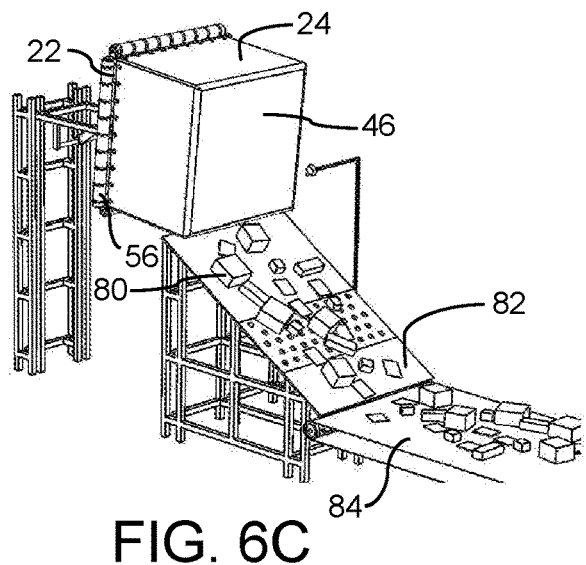

In FIG. 6A the raised bin assembly 20 is shown tilted in a tilted position with the bag 24 in the fully non-inverted position. Articles 80 start to drop from the bag 24 onto a declining slide or ramp 82. To help further empty the bag 24 of articles, the reels 56 start to reel in the bag to move its bottom 46 through the bin's interior toward the top opening 32 of the bin 22 as in FIG. 6B. The moving bottom 46 pushes articles 80 out the bag 24. The reels 56 continue to reel in the bag 24 until its bottom 46 is at the top of the bin 22 and all the articles 80 have been discharged onto the ramp 82 as in FIG. 6C. The articles 80 slide down the ramp 82 onto an infeed conveyor 84 feeding a downstream processing system. The bin assembly is untilted by the tilter and then lowered by the lift to its lowered position while the bag is returned to its non-inverted position. In reeling the bag to the inverting position, the reels could be operated with a stop-and-go impulsive motion to agitate the articles with the stop-and-go motion of the bottom and aid their exit from the bin assembly.

Figure 7A:
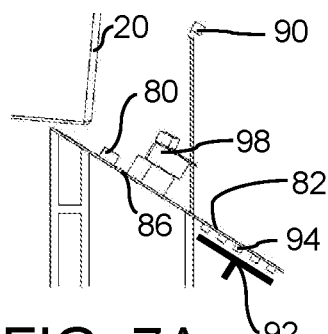
FIGS. 7A-7D are side elevation views of the slide of the apparatus of FIGS. 6A-6C showing the sequence of raising stops to help separate dumped articles.
Figure 7B:
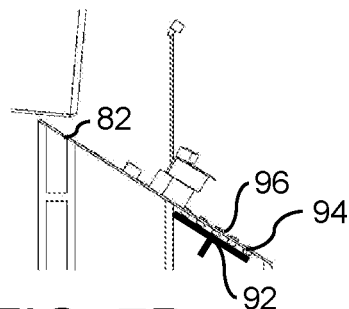
Figure 7C:
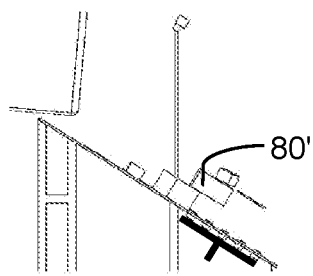
Figure 7D:
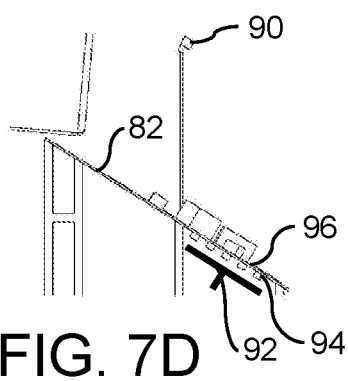

As shown in FIG. 7A, articles 80 falling from the bin assembly 20 often land on the upper end 86 of the ramp 82 stacked atop each other or in a clump 98 of articles leaning on one another. A camera 90 mounted above the upper end 86 of the ramp 82 produces a video image of the articles 80 dumped from the bin assembly 20. If a dump or stack of articles is detected from the video image, a stop actuator 92 moves stops 94, such as bumpers, from a non-blocking position, as in FIG. 7A, to a blocking position, as in FIGS. 7B and 7C. In the blocking position, the stops 94 protrude above the outer conveying surface 96 of the ramp 82. The stops 94 block the advance of articles riding directly in contact with the outer surface 96 of the ramp 82. The ramp's declination and the jolt caused by the sudden stop of the bottom articles encountering the stops 94 tend to cause articles 80' stacked atop or with their leading edges leaning against the lower blocked articles to slide off the blocked articles onto the tops of the stops as shown in FIG. 7C. Once the video image produced by the camera 90 detects no dumped or stacked articles, the stop actuator 92 deactivates the stops 94 and allows them to return to their un-blocking position at or below the conveying surface 96 of the ramp 82, as shown in FIG. 7D.

Figure 8:
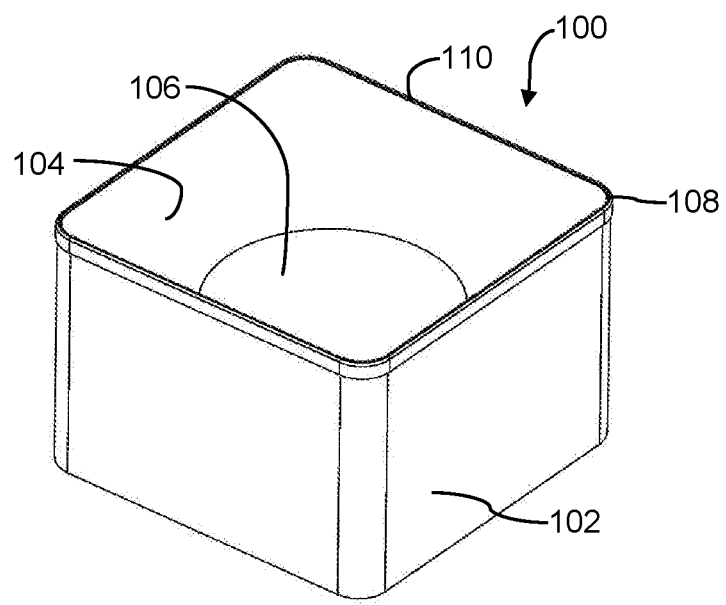
FIG. 8 is an isometric view of another version of a bin usable in an unloading apparatus as in FIGS. 5A-5C.
Figure 9:
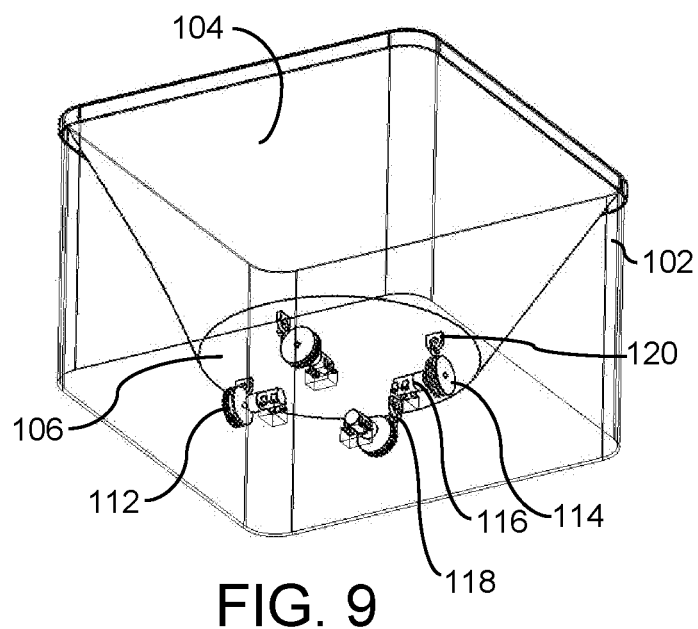
FIG. 9 is an isometric view in phantom showing the winch for the bin of FIG. 8.
Figure 10A:
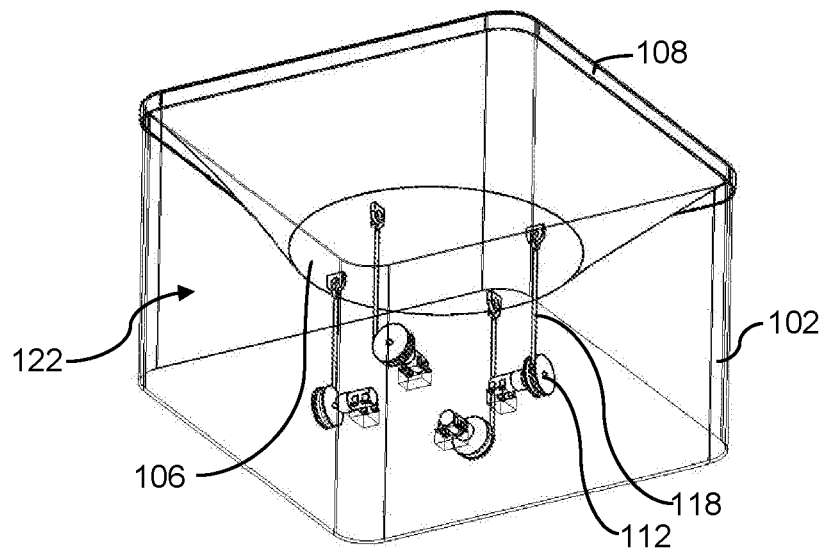
FIGS. 10A-10B are isometric views in phantom of the bin of FIG. 8 showing the sequence of emptying the bin.
Figure 10B:
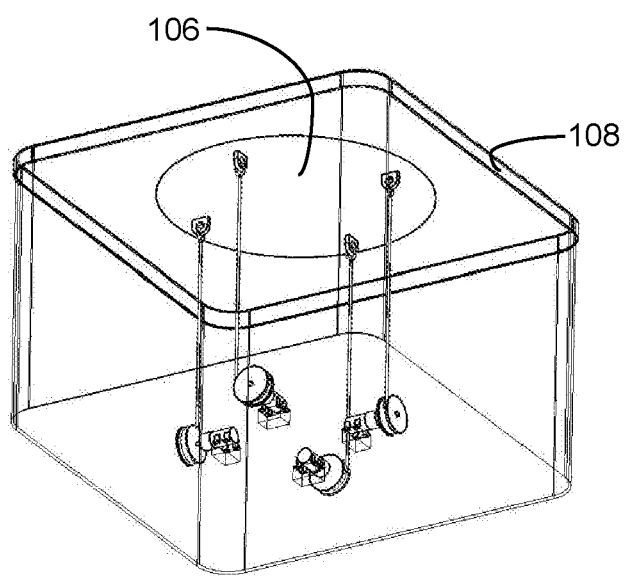
Figure 11A:
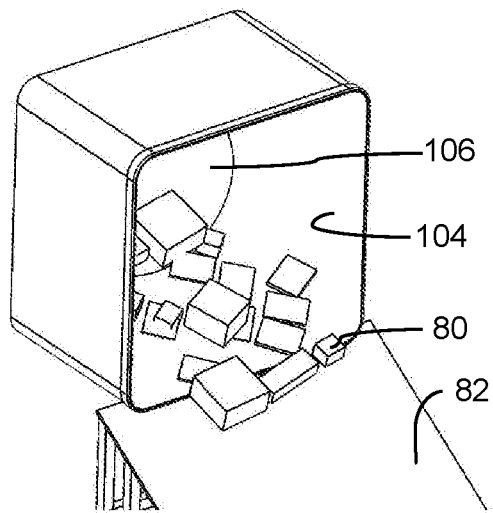
FIGS. 11A-11B are isometric views of the bin of FIG. 8 showing the sequence of dumping articles onto a ramp as in FIGS. 5A-5C.
Figure 11B:
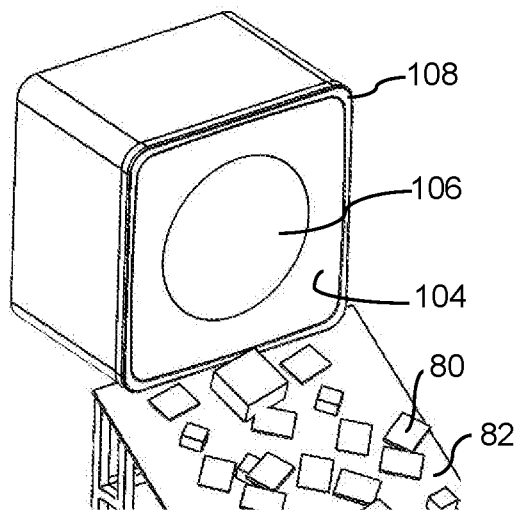

Another version of a bin assembly is shown in FIGS. 8 and 9. The bin assembly 100 includes a bin 102, shown in this example as having a rounded rectangular shape. A bag 104 formed by a stretchable material with a semi-rigid center 106 is attached to a rim 108 of the bin 102 at top edges 110 of the bag. As shown in FIG. 9, in which the bin 102, the bag 104, and its center 106 are transparent, the center of the bag is attached to a winch. The winch includes, in this example, four motorized pulleys 112 as reels. Each pulley 112 has sheaves 114 rotated by motors 116. Lines 118 wound on the pulley sheaves 114 are attached at their distal ends to eyelets 120 on the semi-rigid center 106, which serves as the bottom of the bag 104. In FIG. 9 the bag 104 is shown stretched by the reeled-in lines 118 on the pulley reels 112. As the reels 112 pay out the lines 118 as shown in the continuing sequence in FIGS. 10A and 10B, the tension in the stretched bag material pulls the bottom 106 (the semi-rigid center) upward through the interior 122 of the bin 102 to its top rim 108. The bag 104 is shown in FIG. 10B in its relaxed, unstretched (or least stretched) state with the bottom 106 at about the level of the bin's rim 108. FIGS. 11A and 11B show the expulsion of articles 80 from the bin assembly 100 onto the ramp 82 aided by the release of tension in the stretched bag 104 as the winch lines are payed out and the bottom 106 of the bag moves toward the bin's rim 108, decreasing the bag's volume in the interior 122 of the bin 102. The winch reels 112 can be operated to step the release of the stretchable bag material by freewheeling and then braking the winch reels to agitate the articles 80. The bin assembly 100 of FIG. 8 can be used in place of the bin assembly 20 of FIG. 2 with the tilter 70 and the lift 76 of FIG. 5A.

Figure 12:
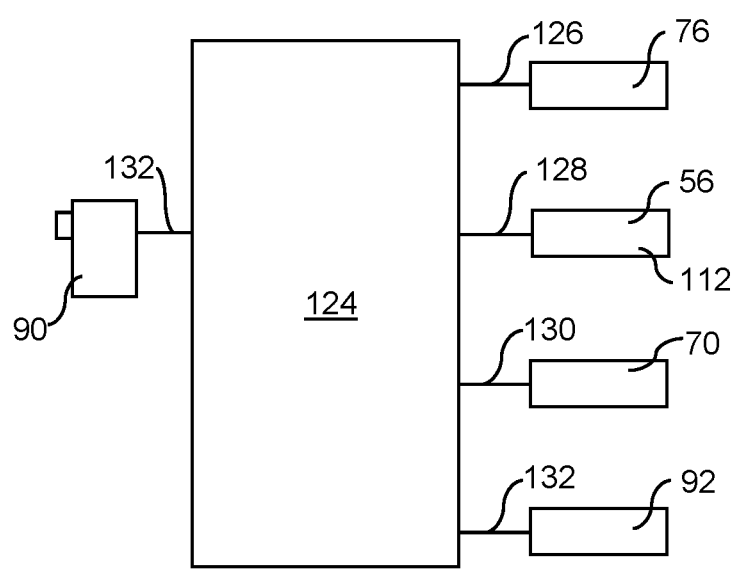
FIG. 12 is a block diagram of a controller usable to control an unloading apparatus as in FIGS. 5A-5C.

The operation of the parcel-unloading apparatus can be controlled by a control system as shown in FIG. 12. A controller 124 such as a programmable logic controller or a general purpose computer programmed to operate the unloading apparatus, controls the unloader. The controller 124 sends a lift signal 126 to the motorized lift 76 to raise and lower the bin assembly. The controller 124 sends winch signals 128 to the winch reels 56, 112 to move the bottom of the bag through the interior of the bin. The controller 124 sends tilt signals 130 to the tilt actuator 70 to tilt and untilt the bin assembly. And the controller 124 sends block signals to the stop actuator 92 to block the bottommost article in an article dump to separate the dump in response to video images 132 taken by the camera 90.

Features of the invention have been described by reference to a couple of versions, but other versions are possible. For example, the motors and actuators can be realized as pneumatic actuators, hydraulic actuators, electromagnetic actuators, or linear actuators. And the articles may be parcels, letters, aggregates, or other articles. And the stretchable material of the bag in FIG. 8 could be attached to the rim of the bin permanently or removably through the use of zippers, snaps, or bolts, for example. So, as these few examples suggest, the scope of the claims is not meant to be limited to the details of the exemplary versions.

What is claimed is:
1. An article-unloading apparatus comprising:
a bin having an interior and a top opening bounded by a rim;
a bag for holding articles, the bag having a bottom in the interior of the bin and an opposite top edge portion;
a winch below the rim and connected to the bag to raise and lower the bottom of the bag through the interior of the bin;
a tilter connected to the bin to tilt the bin to a tilted position to discharge articles from the bag.
2. The apparatus as claimed in claim 1 wherein the winch comprises a plurality of reels outside the bin and below the rim and a plurality of lines wound around the reels, wherein distal ends of the lines are attached to the top edge portion of the bag so that, as the lines are reeled in on the reels, the top edge portion of the bag is pulled downward toward the reels to invert the bag over the rim of the bin and move the bottom of the bag through the interior of the bin toward the top opening.
3. The apparatus as claimed in claim 2 wherein the bottom of the bag is weighted to move downward through the interior of the bin as the lines are payed out from the reels and to open the bag in the interior of the bin.
4. The apparatus as claimed in claim 2 wherein the bag includes grommets along the top edge portion to which the distal ends of the lines are attached.
5. The apparatus as claimed in claim 2 wherein the rim is made of a low-friction surface or includes rollers to reduce friction between the rim and the bag as the bag is pulled over the rim.

6. The apparatus as claimed in claim 1 wherein the bag comprises a flexible sheet attached at the top edge portion to the rim of the bin and wherein the bottom of the bag is semi-rigid.

7. The apparatus as claimed in claim 6 wherein the winch comprises a plurality of reels and a plurality of lines wound round the reels, wherein distal ends of the lines are attached to the bottom of the bag so that, as the lines are reeled in on the reels, the flexible sheet is stretched as the bottom of the bag is pulled downward through the interior of the bin, and, as the lines are payed out from the reels, the bottom of the bag is pulled upward through the interior of the bin toward the top opening by tension in the stretched flexible sheet.

8. The apparatus as claimed in claim 1 wherein the winch raises the bottom of the bag while the bin is in the tilted position.

9. The apparatus as claimed in claim 1 comprising a ramp having a conveying surface extending from an upper end receiving articles from the tilted bin to a lower end to which the articles advance.

10. The apparatus as claimed in claim 9 comprising a lift lifting the bin above the level of the upper end of the ramp for the tilter to tilt the bin to discharge articles onto the ramp.

11. The apparatus as claimed in claim 9 comprising retractable stops in the ramp movable from a blocking position in which the stops protrude far enough outward of the conveying surface to block articles riding directly on the conveying surface from advancing, but not clumped articles atop the blocked articles, to a non-blocking position in which the stops are retracted at or below the conveying surface to allow articles riding directly on the conveying surface to advance down the ramp.

12. The apparatus as claimed in claim 11 comprising a camera taking video images of the articles discharged onto the ramp and a controller discerning clumped articles from the video images and causing the stops to move to the blocking position to block articles below the clumped articles from advancing down the ramp and causing the stops to move to the non-blocking position in the absence of clumped articles.

13. The apparatus as claimed in claim 1 wherein the winch uses stop-and-go motion to agitate articles in the bag by the stop-and-go motion of the bottom of the bag.

14. An article-unloading apparatus comprising:
a bin having an interior and a top opening bounded by a rim;
a bag for holding articles in the interior of the bin;
wherein the bag comprises a flexible sheet and has a semi-rigid bottom and a top edge portion attached to the rim of the bin;
a winch below the rim and connected to the bag to increase and decrease the volume of the bag in the interior of the bin;
wherein the winch comprises a plurality of reels and a plurality of lines wound round the reels, wherein distal ends of the lines are attached to the bottom of the bag so that, as the lines are reeled in on the reels, the flexible sheet is stretched as the bottom of the bag is pulled downward through the interior of the bin, and, as the lines are payed out from the reels, the bottom of the bag is pulled upward through the interior of the bin toward the top opening by tension in the stretched flexible sheet.

15. The apparatus as claimed in claim 14 wherein the bag has a weighted bottom.

16. The apparatus as claimed in claim 14 comprising a tilter connected to the bin to tilt the bin to a tilted position to discharge articles from the bag.

17. The apparatus as claimed in claim 16 comprising a ramp having a conveying surface extending from an upper end receiving articles from the tilted bin to a lower end to which the articles advance.

18. The apparatus as claimed in claim 17 comprising a lift lifting the bin above the level of the upper end of the ramp for the tilter to tilt the bin to discharge articles onto the ramp.

19. The apparatus as claimed in claim 17 comprising retractable stops in the ramp movable from a blocking position in which the stops protrude far enough outward of the conveying surface to block articles riding directly on the conveying surface from advancing, but not clumped articles atop the blocked articles, to a non-blocking position in which the stops are retracted at or below the conveying surface to allow articles riding directly on the conveying surface to advance down the ramp.

20. An article-unloading apparatus comprising:
a bin having an interior and a top opening bounded by a rim;
a bag for holding articles in the interior of the bin;
a winch connected to the bag to increase and decrease the volume of the bag in the interior of the bin;
wherein the bag has a top edge portion lapped over the rim and wherein the winch comprises a plurality of reels outside the bin and below the rim and a plurality of lines wound around the reels, wherein distal ends of the lines are attached to the top edge portion of the bag so that, as the lines are reeled in on the reels, the top edge portion of the bag is pulled downward toward the reels to invert the bag over the rim of the bin.

21. The apparatus as claimed in claim 20 wherein the bottom of the bag is weighted to move downward through the interior of the bin as the lines are payed out from the reels and to open the bag in the interior of the bin.

22. The apparatus as claimed in claim 20 wherein the bag includes grommets along the top edge portion to which the distal ends of the lines are attached.

23. The apparatus as claimed in claim 20 wherein the rim is made of a low-friction surface or includes rollers to reduce friction between the rim and the bag as the bag is pulled over the rim.

* * * * *